Figure 4:
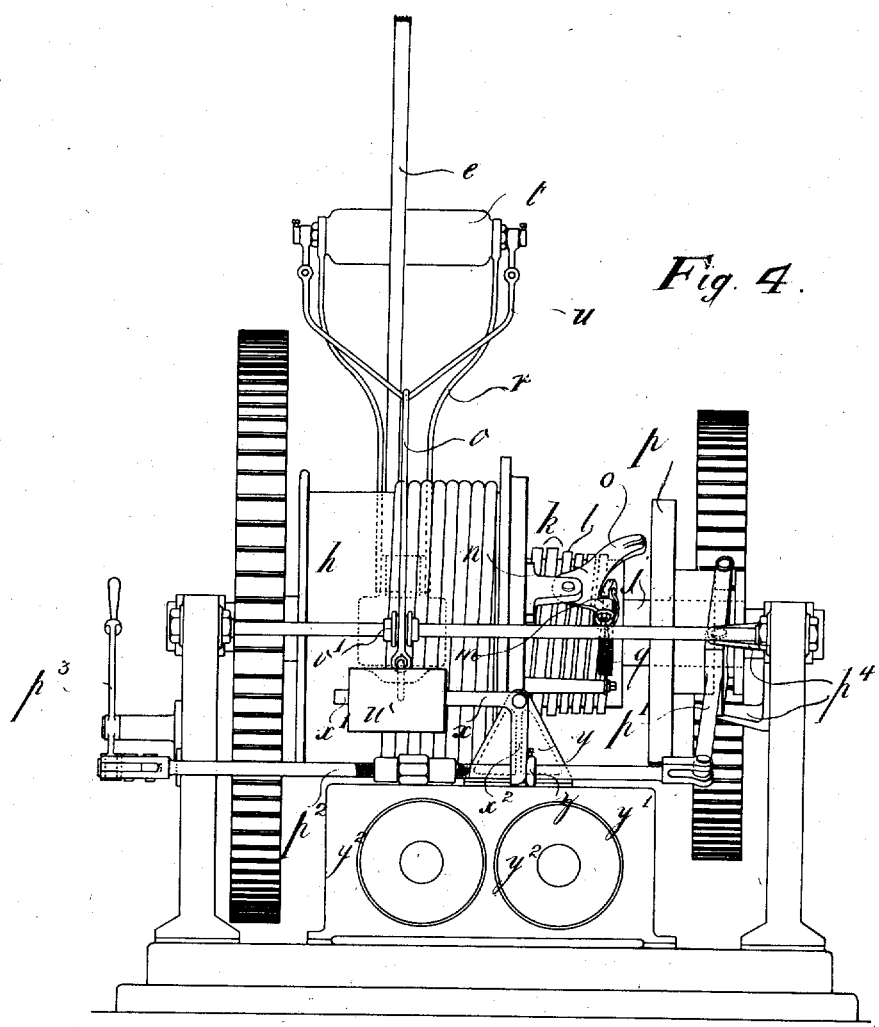

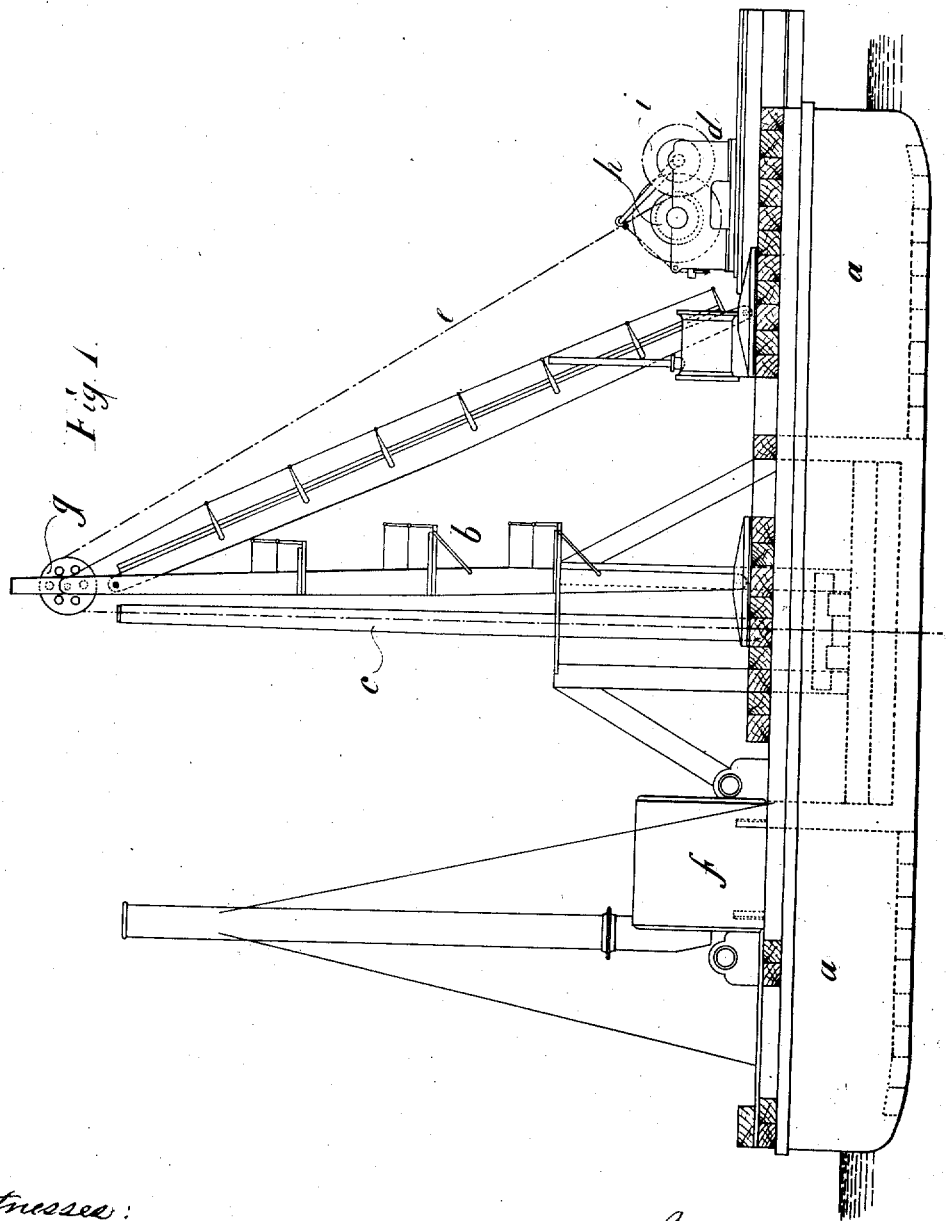

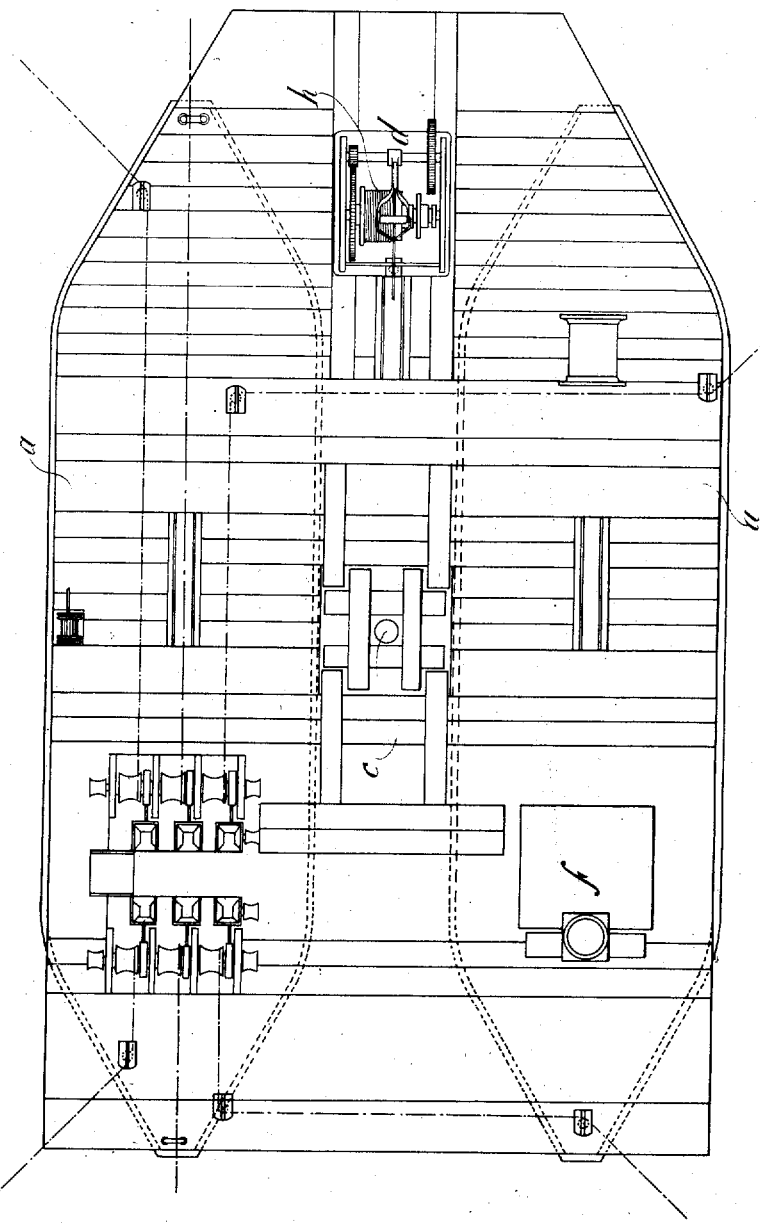

No. 707,128. Patented Aug. 19, 1902.
F. LOBNITZ.
ROCK CUTTING APPARATUS.
(Application filed Apr. 2, 1902.)
(No Model.) 6 Sheets—Sheet 3.
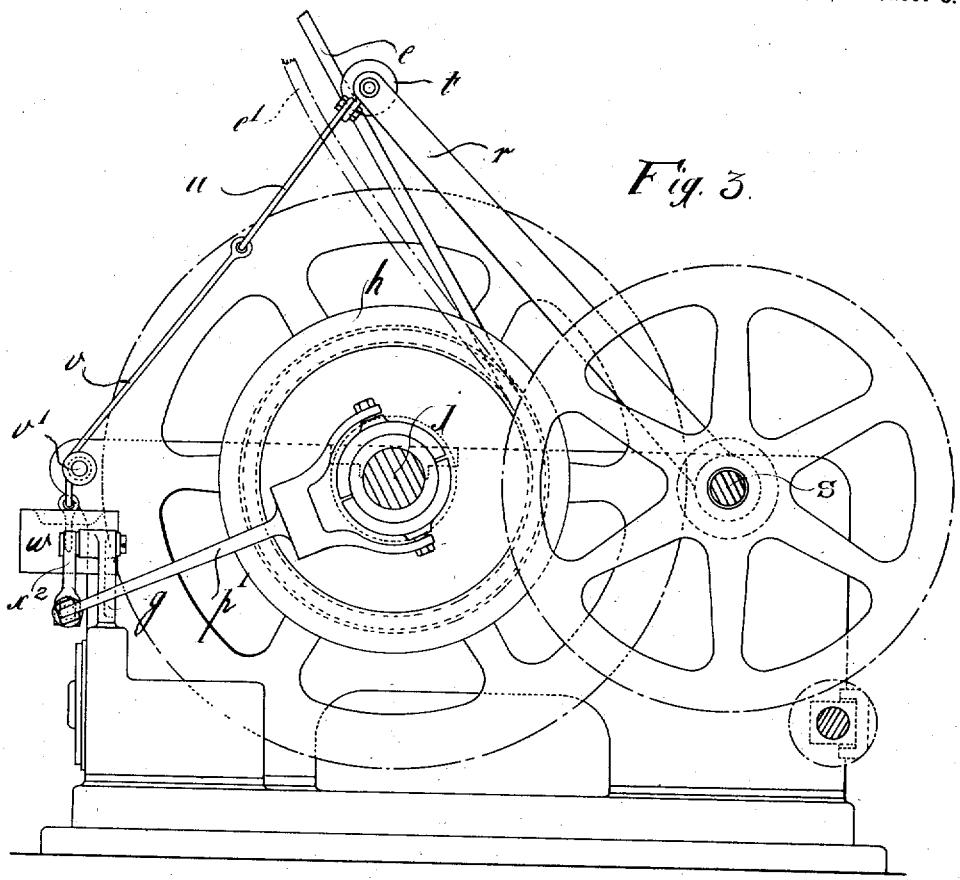
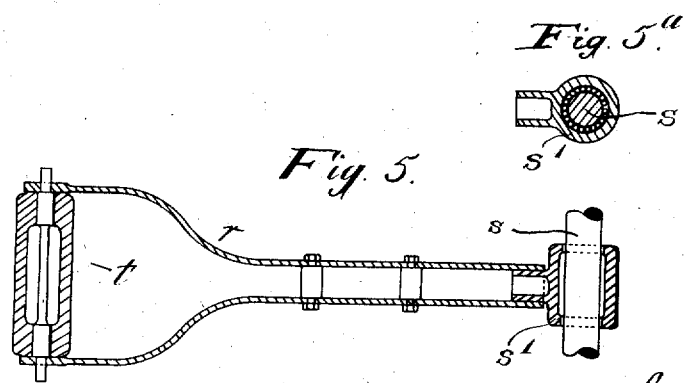

No. 707,128. Patented Aug. 19, 1902.
F. LOBNITZ.
ROCK CUTTING APPARATUS.
(Application filed Apr. 2, 1902.)
(No Model.) 6 Sheets—Sheet 4.

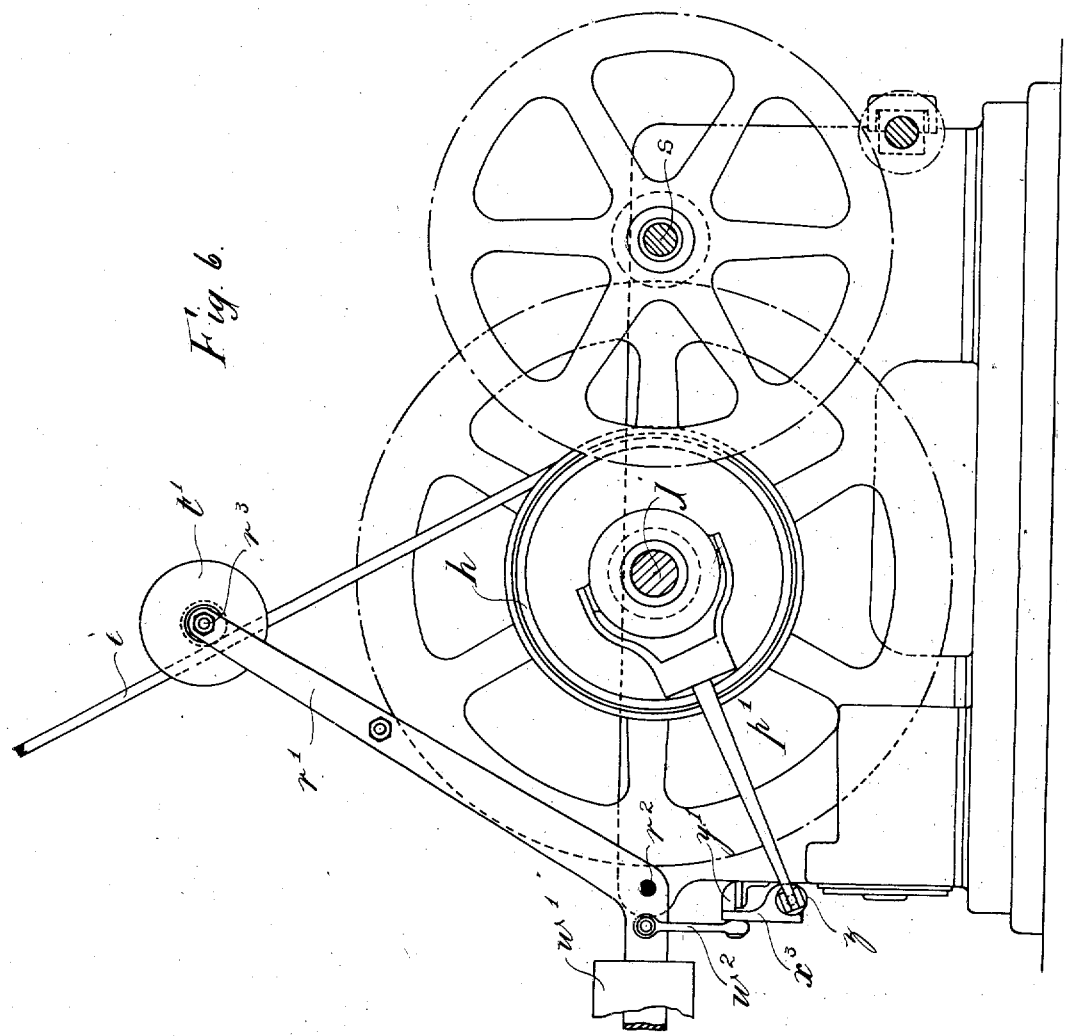

No. 707,128. Patented Aug. 19, 1902.
F. LOBNITZ.
ROCK CUTTING APPARATUS.
(Application filed Apr. 2, 1902.)
(No Model.)
6 Sheets—Sheet 6.
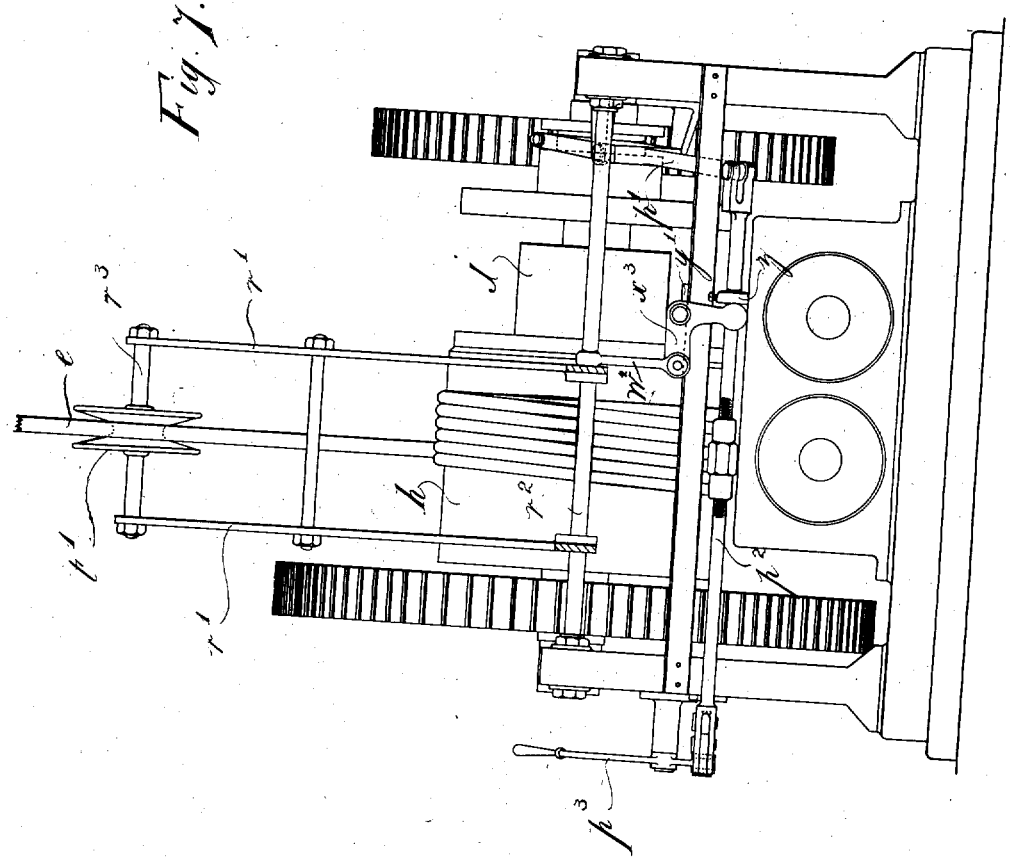

UNITED STATES PATENT OFFICE.

FRED LOBNITZ, OF RENFREW, SCOTLAND.

ROCK-CUTTING APPARATUS.

SPECIFICATION forming part of Letters Patent No. 707,128, dated August 19, 1902.

Application filed April 2, 1902. Serial No. 101,080. (No model.)

*To all whom it may concern:*

Be it known that I, FRED LOBNITZ, engineer and ship-builder, a subject of the King of Great Britain, and a resident of Clarence House, Renfrew, Scotland, have invented certain new and useful Improvements Connected with Rock-Cutting Apparatus, of which the following is a specification.

This invention relates to apparatus known as "rock-cutting apparatus" for cutting or breaking up rocks, boulders, stones, hard earth, and such like whether under water or on dry land.

In order that the rock-cutting apparatus may be worked as efficiently and cheaply as possible, it is necessary that the blows given by the rock-cutter should be delivered in quick succession. At present the rock-cutter is raised up by the action of a steam-winch provided with a winding-drum, which when the cutter is to be raised is clutched to the winch-shaft and when the cutter is to be lowered is unclutched and allowed to run freely, so as to pay out the rope attached to the cutter as the latter falls down and strikes the rock. The clutch used is preferably a coil-clutch, which the winchman operates by means of a hand-lever. In order to save time in the raising of the rock-cutter after each blow, it is usual for the winchman to clutch the winch-drum to its shaft as soon as possible after the cutter has struck the rock, so as to avoid any unnecessary slackening or paying out of the rope attached to the cutter. To actuate the clutch always at the proper times requires watchfulness, combined with care and judgment, on the part of the winchman, and as a matter of practice it has been found difficult to obtain men capable of giving proper attention to the matter. In order to overcome this difficulty, I propose to automatically actuate the clutch at the proper times by means of a suitable mechanical arrangement.

My invention essentially consists in utilizing the natural slackening or kinking of the rope, which occurs each time the cutter strikes the rock, to actuate mechanism whereby the clutch is instantaneously and automatically applied.

The invention can be carried out in various ways; but in order that it may be clearly understood I will now describe, with reference to the drawings annexed, two convenient methods of automatically actuating the clutch. These methods of carrying out the invention are merely given by way of example, and it is to be clearly understood that I do not confine myself thereto.

On the drawings, Figure 1 is a side elevation of a convenient form of rock-cutting barge as used for submarine work. Fig. 2 is a plan view of the same. Fig. 3 is a sectional side view showing my improvements applied to the hoisting-winch. Fig. 4 is a front view of the winch. Fig. 5 is a sectional plan view of part of the clutch-actuating appliance. Fig. 5$^a$ is a cross-section. Figs. 6 and 7 are views, similar to Figs. 3 and 4, of another arrangement of the clutch appliance.

On the drawings, which only show sufficient details of construction of the whole apparatus to enable the present invention to be clearly understood, the same reference-letters wherever repeated indicate the same parts.

$a$ is the barge; $b$, a supporting framework or structure on the barge; $c$, the rock-cutter in the raised position; $d$, the steam hoisting-winch; $e$, the hoisting-rope, and $f$ the steam-generator.

Speaking generally, the rock-cutting apparatus consists of a heavy ram or cutter $c$, having a renewable steel point secured to its lower end and a steel hoisting-rope $e$ attached to its upper end. This rope passes over the pulley $g$ on the top of the structure $b$ and is led down to the winch-drum $h$. The winch may be of any suitable construction, but is preferably a steam-winch with a loose winding-drum and a clutch arrangement whereby the drum can be easily clutched to or unclutched from its driving-shaft.

In Figs. 3 and 4, $j$ is the shaft of the winch-drum, and $k$ is a friction-clutch on a thickened part of the shaft. This clutch may be of any suitable construction, but preferably consists of a coiled steel band $l$, which at one end is attached to the loose drum $h$ and at the other end is attached to the short arm $m$ of the bent lever $n$, whose long arm $o$ rests against the disk $p$, which can be slid along the winch-shaft by means of the lever-gear $p'$ $p^2$ $p^3$. The coil-clutch, as well as the winch-drum, revolves loose on the winch-shaft when the hoisting-rope is being paid out. When the clutch is loose, the spring $q$ retains the arm $o$ of the lever $n$ against the disk $p$. The drum is frictionally clutched to the winch-shaft by actuating the levers $p'$ $p^2$ $p^3$ so as to move the disk $p$ and press back the arm $o$ of the lever $n$ in order to cause said lever to pull the coil and tighten it with a frictional grip upon the shaft. This is the clutch now employed in the best practice of the art. The levers $p'$ $p^2$ $p^3$ have heretofore been operated by hand when applying the clutch, and I propose to perform the operation mechanically. Immediately the rock-cutter strikes the rock it causes the hoisting-rope to kink or bend, and I take advantage of this by arranging, as shown at Figs. 3, 4, and 5, a roller $t$ upon an arm $r$ in such manner as to rest upon the hoisting-rope. This arm is secured to the shaft $s$ in such manner that it can move freely. It may be attached by means of a roller bearing or sleeve $s'$ in order to insure the greatest freedom of movement. Attached to the spindle of the roller $t$ is a V-shaped bar $u$, to which a wire rope $v$ is secured. This wire rope, which runs over a pulley $v'$ on the winch-frame, has at its lower end a heavy weight $w$, through which the long arm $x'$ of a bell-crank lever $x$ passes. This lever $x$ is fulcrumed, by means of a pin, on a bracket $y$, secured to the casing $y'$ of the winch-cylinders $y^2$. The short arm $x^2$ of the lever $x$ is forked at its lower end and bears against an adjustable collar $z$ on the rod $p^2$, which is attached to the end of the forked clutch-operating lever $p'$. This lever is fulcrumed in jaws $p^4$, attached to the winch-framing. The whole arrangement is such that when the rope kinks or slackens in the manner indicated by the dotted lines at $e'$, Fig. 3, the weight $w$ sinks and in so doing operates the bell-crank lever $x$, rod $p^2$, and lever $p'$, thereby forcing the disk $p$ against the long arm $o$ of the lever $n$ and causing said lever $n$ to move backward and at the same time by means of the short arm $m$ to tighten the coil-clutch upon the shaft $j$ of the winch. The arm $r$ merely serves to support the roller $t$ in place.

If desired, instead of having the arrangement before set forth there may be an arrangement such as shown at Figs. 6 and 7. In this case the arm $r$ is dispensed with and a double arm $r'$ used. This arm is centered upon a bar $r^2$, secured to the winch-framing, and it supports at its upper end on a cross-bar $r^3$ a grooved sliding pulley $t'$. The arm is cranked at its lower end and provided with a heavy weight $w'$. Secured to the cranked part of the arm $r'$ is a link $w^2$, which is jointed at its lower end to the bell-crank $x^3$. This bell-crank is fulcrumed on the bracket $y'$. Its lower end is forked and actuates, as before, the rod $p^2$ by striking against its collar $z$.

The action of the improved mechanism does not in any way interfere with the working of clutch whenever so desired by means of the hand-lever $p^3$.

If so desired, a spring action may be used instead of the action of a weight, such as $w$ or $w'$, or the movement of the roller $t$ (or $t'$) and the arm $r$ (or $r'$) may be utilized to start a steam, pneumatic, hydraulic, or electric motor in action, so as to shift the lever $p'$ and apply the clutch. It is obvious also that a powerful electromagnet may be so arranged as to operate this lever $p'$ through suitable mechanism whenever excited by the passing of an electric current through it. The controlling of the current can be effected by mechanism operated by the arm $r$, (or $r'$.) It is not necessary that I should explain fully how these alternative arrangements may be carried out, as they will be obvious to any one skilled in the art to which this invention relates.

Having now fully described my invention, what I claim, and desire to secure by Letters Patent, is—

1. In rock-cutting apparatus, the combination of a cutter, a winch with winding-drum, winding means connecting the cutter with the winch-drum, a clutch in connection with the drum, and means set in operation by the winding means for applying the clutch.

2. In rock-cutting apparatus, the combination of a cutter, a winch with winding-drum, winding means connecting the cutter with the winch-drum, a clutch in connection with the drum, and means set in operation by the winding means for automatically applying the clutch.

3. In rock-cutting apparatus, the combination of a cutter, a winch with winding-drum, a clutch in connection with the drum, a rope connecting the cutter with the drum, and means set in operation by the rope for applying the clutch.

4. In rock-cutting apparatus, the combination of a cutter, a winch with winding-drum, a coil-clutch in connection with the drum, a rope connecting the cutter with the drum, and means set in operation by the rope for applying the coil-clutch.

5. In rock-cutting apparatus, the combination of a cutter, a winch with winch-shaft, a drum loosely mounted on the shaft, a coil-clutch for clutching the drum to the shaft, a hoisting-rope connecting the cutter with the drum, and means set in operation by the rope for applying the clutch, substantially as set forth.

6. In rock-cutting apparatus, the combination of a cutter, a winch with winding-drum, a clutch in connection with the drum, a rope connecting the cutter with the drum, means for operating the clutch, and means set in operation by the rope for actuating said clutch-operating means, substantially as set forth.

7. In rock-cutting apparatus, the combination of a cutter, a winch with winding-drum, a clutch in connection with the drum, a rope connecting the cutter with the drum, a lever for operating the clutch, and means set in operation by the rope for actuating said lever, substantially as set forth.

8. In rock-cutting apparatus, the combination of a cutter, a winch with winding-drum, a clutch in connection with the drum, a rope connecting the cutter with the drum, a lever for operating the clutch, a rod connected with said lever, and means set in operation by the rope for operating said rod, substantially as set forth.

9. In rock-cutting apparatus, the combination of a cutter, a winch with winding-drum, a clutch in connection with the drum, a rope connecting the cutter with the drum, a lever for operating the clutch, a rod connected with the lever, a collar on the rod, a bell-crank lever capable of striking against said collar and operating said rod, and means for operating the bell-crank lever, substantially as set forth.

10. In rock-cutting apparatus, the combination of a cutter, a winch with winding-drum, a clutch in connection with the drum, a rope connecting the cutter with the drum, a lever for operating the clutch, a rod connected with the lever, a collar on the rod, a bell-crank lever capable of striking against said collar and operating said rod, a weight on the bell-crank, and means connecting said weight with the hoisting-rope, substantially as set forth.

11. In rock-cutting apparatus, the combination of a cutter, a winch with winding-drum, a clutch in connection with the drum, a rope connecting the cutter with the drum, a lever for operating the clutch, a rod connected with the lever, a collar on the rod, a bell-crank lever capable of striking against said collar and operating said rod, a weight on the bell-crank, a rope attached to said weight, and a roller secured to said rope and which rests upon the hoisting-rope, substantially as set forth.

12. In rock-cutting apparatus, the combination of a cutter, a winch with winding-drum, a clutch in connection with the drum, a rope connecting the cutter with the drum, a lever for operating the clutch, a rod connected with the lever, a collar on the rod, a bell-crank lever capable of striking against said collar and operating said rod, a weight on the bell-crank, a rope attached to said weight, a roller secured to said rope, and means for supporting the roller so that it may rest upon the hoisting-rope, substantially as set forth.

13. In rock-cutting apparatus, the combination of a cutter, a winch with winding-drum, a clutch in connection with the drum, a rope connecting the cutter with the drum, a lever for operating the clutch, a rod connected with the lever, a collar on the rod, a bell-crank lever capable of striking against said collar and operating said rod, a weight on the bell-crank, a rope attached to said weight, a roller secured to said rope, and an arm movably secured to the winch for supporting the roller so that it may rest upon the hoisting-rope, substantially as set forth.

Signed at Glasgow, Scotland, this 19th day of February, 1902.

FRED LOBNITZ.

Witnesses:
H. D. FITZPATRICK,
WILLIAM GALL.